United States Patent [19]
Yamada

[11] Patent Number: 5,214,546
[45] Date of Patent: May 25, 1993

[54] MAGNETIC RECORDING REPRODUCER HAVING A CONTROLLER FOR DETECTING THE TRACKING POSITION OF A HEAD ON A MAGNETIC TAPE

[75] Inventor: Yasuyuki Yamada, Yokohama, Japan

[73] Assignee: Victor Company of Japan, Ltd., Yokohama, Japan

[21] Appl. No.: 427,387

[22] Filed: Oct. 27, 1989

[30] Foreign Application Priority Data

Oct. 27, 1988 [JP] Japan ................................ 63-271484

[51] Int. Cl.[5] ...................... G11B 21/04; G11B 5/584
[52] U.S. Cl. ................................ 360/77.13; 360/70; 360/77.01
[58] Field of Search .............. 360/70, 77.13, 77.12, 360/77.14; 358/351, 353, 354, 325

[56] References Cited

U.S. PATENT DOCUMENTS

| | | | |
|---|---|---|---|
| 3,890,558 | 6/1975 | Guisinger et al. | 358/325 |
| 4,402,022 | 8/1983 | Hirota et al. | 360/77 |
| 4,590,523 | 5/1986 | Honjo et al. | 360/10.3 |
| 4,613,914 | 9/1986 | Kobori et al. | 360/70 |
| 4,646,175 | 2/1987 | Sokolik et al. | 360/77.14 |
| 4,771,188 | 9/1988 | Cheng et al. | 307/351 |
| 4,812,926 | 3/1989 | Jeon | 360/70 |
| 4,918,546 | 4/1990 | Saito | 360/77.13 |
| 5,055,952 | 10/1991 | Noh | 360/77.14 |

FOREIGN PATENT DOCUMENTS 59-198556 11/1984 Japan ................................ 360/77.13

OTHER PUBLICATIONS

*Microelectronics;* Millman, Jacob; 1979 ISBN 0-0-7-042327-X.

Primary Examiner—Stuart S. Levy
Assistant Examiner—Jefferson Evans
Attorney, Agent, or Firm—Lowe, Price, LeBlanc & Becker

[57] ABSTRACT

A magnetic recording reproducer having a system controller for detecting a level obtained by integrating and averaging a television signal reproduced by using a head thereof within a predetermined integrating time interval when reproducing the television signal recorded on a magnetic tape. Detecting a tracking position of the head is done by changing a relative positional between the head and the magnetic tape by driving a servo circuit. The reproducer includes a rectifier for rectifying the reproduced signal and converting the reproduced signal into a signal indicating a DC level, a voltage controlled current source for varying an output current in response to an output voltage of the rectifier, a capacitor charged by the output current of the voltage controlled current source, a level detecting circuit for detecting a charged voltage of the capacitor and a reset signal generating circuit for discharging and controlling the capacitor in synchronization with integrating time interval.

4 Claims, 4 Drawing Sheets

MAGNETIC RECORDING REPRODUCER HAVING A CONTROLLER FOR DETECTING THE TRACKING POSITION OF A HEAD ON A MAGNETIC TAPE

BACKGROUND OF THE INVENTION

1. Field of the Invention

This invention generally relates to a magnetic recording reproducer for reproducing television signals recorded on a magnetic tape and more particularly to an automatic tracking system of the magnetic recording reproducer.

2. Description of the Related Art

When television signals recorded on a magnetic tape by a video tape recorder (VTR) are reproduced or played back by another VTR, the picture quality of the reproduced picture is sometimes poorer than that obtained in case where the television signals are played back by the same VTR used for recording thereof on the tape. This is because of a tracking error occurring due to the fact that these two VTRs are not completely identical with each other in mechanical and electrical precision and thus, as shown in FIG. 5, the video head of the VTR used for the playback of the television signals does not always precisely trace the central axis or line, which is indicated by a one-dot chain line in this figure, of a recorded diagonal track on the video tape, that is, there may occur a difference between the path of the video head and the central line of the track. At that time, an operator or user must to adjust a tracking control switch of the VTR to the position, at which the best picture quality can be obtained, observing the screen of a display device connected to the VTR or a Hi-Fi track level meter of the VTR.

One of the recent advances in technology is the use of a magnetic recording reproducer provided with an automatic tracking system which can automatically perform the entire tracking control to resolve the above described problem.

With such a magnetic recording reproducer having an automatic tracking system for automatically obtaining the optimum tracking, it is necessary to detect the level of the signals to be detected. For example, video FM signals are processed and audio frequency modulated (FM) signals by integrating and averaging outputs of a detecting circuit, which is used for detecting these signals as an interface circuit, corresponding to one frame. Further, the automatic tracking system is adapted to search or detect the optimum tracking position on the basis of the detected level of the signal.

Conventionally, when the waveform of a predetermined section of a signal is integrated and averaged, the result thereof is obtained by first sampling the inputted waveform at sampling intervals, each of which is sufficiently short in comparison with an integral interval, performing analog-to-digital (AD) conversion of the sampled data and further effecting integration processing.

FIG. 6 shows a conventional level detecting circuit of such a type, in which the video and audio FM signals recorded on the magnetic tape are detected by the head and are further rectified by a detecting circuit 2 through an amplifier 1 and as a result, are converted into a direct current (DC) signal having a constant level. The high-frequency components are eliminated through a low-pass filter (LPF) 3. Furthermore, the analog values indicated by the thus obtained DC signal are converted by an AD converter 4 and are added by an adder 5 so as to obtain an integrated value as a result of the integral of the FM signals within a predetermined time interval, for example, one frame period.

Thus, the variation in level occurring due to the misalignment of the linearities of the magnetic track and the path of the head is eliminated and averaged by using the integrated value obtained by such a level detecting circuit, and the automatic tracking system is adapted to detect the tracking position of the head, at which the integral of the signal of a frame reaches a maximum value thereof, on the basis of the result of the level detection.

The level detecting circuit, however, requires sampling many data in the integrating interval with respect to time for calculation of the integral of the signal and further performing the integration by using the sampled data, as described above. Furthermore, to obtain accurate samples or data, it is necessary to insert a low-pass filter 3 having sharp cut-off characteristics just prior to an AD converter 4. Therefore, in case where the processing such as the calculation of the integral of the signal is carried out by a central processing unit (CPU), a load on the CPU becomes considerably large. Thus, a CPU dedicated to such processing is needed. This results in a complex configuration of the circuit and a high manufacturing cost.

Further, if an appropriate integral time constant is selected in such a manner to obtain a satisfactory mean value of the level, the selected time constant becomes very large. In case of the application of such a conventional technique to the automatic tracking system, although it is preferable to change the tracking position at a high speed in order to immediately obtain the integral of the FM signal, which is to be reproduced over a corresponding predetermined intergrating interval, for instance, one frame, actual response to the change of the tracking position is slow, and thus an accurate value of the integral thereof cannot be obtained.

For example the cut-off frequency of the low-pass filter 3 is fc; and the sampling frequency of the AD converter 4 be fs. Further, to reduce aliasing errors, a low-pass filter is required having sharp cut-off characteristics, of which the cut-off frequency fc is one-half of the sampling frequency fs. However, if the sampling frequency fc is made higher in order to get real time information, it is required that a great number of AD conversions of data obtained within a predetermined intergrating interval is performed and further at each of the AD conversions an addition of the converted data is effected. As a result, the processing time or executing time of executing programs becomes longer and thus, the load on the CPU becomes large especially in case of effecting parallel processing. On the other hand, when the cut-off frequency of the low-pass filter is reduced to decrease the number of times of effecting the AD conversions, there is a problem that the quick control of the tracking cannot be effected because of the delay occurring between the outputting of the integral of the reproduced FM signal and the change of the reproduced FM signal.

SUMMARY OF THE INVENTION

The present invention eliminates the above-described problems of the prior art magnetic recording producer. It is accordingly an object of the present invention to provide a magnetic recording reproducer including a level detecting circuit which can detect an output of a reproduced FM signal by performing one sampling during an integrating interval of the FM signal without delay time. Thus, the low-pass filter normally used with such devices can be eliminated.

Further, it is another object of the present invention to provide a magnetic reproducing reproducer having a system controller which can detect an optimum tracking position of the head on the basis of the level of the reproduced FM signal detected by the level detecting circuit.

To achieve the foregoing objects, a first embodiment of the invention includes a magnetic recording reproducer having a head, and a level detecting circuit for detecting an analog level obtained by integrating and averaging a television signal reproduced by using the head within a predetermined integrating time interval when producing the television signal recorded on a magnetic tape. The reproducer also has a system controller for converting the analog level into a digital level and for detecting a tracking position of the head by changing a relative positional relation between the head and the magnetic tape by driving a servo circuit on the basis of the digital level. The level detecting circuit includes a detection circuit for rectifying the reproduced television signal and for converting the reproduced television signal into a signal indicating a DC level. The detection circuit also includes a voltage controlled current source for varying an output current thereof in response to an output voltage of the detection circuit. The detection circuit further includes a capacitor charged by the output current of the voltage controlled current source, and a reset signal generating means for discharging and controlling the capacitor in synchronization with the predetermined integrating time interval. The detection circuit also includes a level detecting means for detecting a charging voltage of the capacitor as an analog level and for outputting a signal representing the analog level to the system controller in order to obtain samples of the reproduced television signal of a predetermined integrating time interval without a delay. The system controller judges whether or not a predetermined condition for starting a tracking operation is satisfied, and then detects the maximum level range of a video reproduction signal from the level of the video reproduction signal detected by the level detecting means in response to the tracking address when the predetermined condition for starting a tracking operation has been satisfied. The system controller also judges whether or not an audio signal is recorded on the magnetic tape, and sets a central point of the maximum level range of the video reproduction signal as a tracking position when no audio signals are recorded on the magnetic tape.

Thus, the magnetic recording reproducer of the present invention can detect signal level without delay time by including a level detecting circuit which detects a level of a reproduced FM signal by integrating and averaging the reproduced FM signal over a predetermined time period. Further, the conventional low-pass filter used in such circuits can be eliminated with the present invention. Thus, space is saved and circuit cost is lowered.

Further, real time detection of the level of the reproduced signal over a predetermined period (for example, one frame) can be carried out by the level detecting circuit performing a single sampling of data. Therefore, by applying the present invention to an automatic tracking system, load on the central processing unit of the system controller can be substantially reduced.

In a second embodiment of the present invention, a magnetic recording reproducer includes a head, and a level detecting circuit for detecting an analog level obtained by integrating and averaging a television signal reproduced by using the head within a predetermined integrating time interval when reproducing the television signal recorded on a magnetic tape. A system controller is used for converting the analog level into a digital level and for detecting a tracking position of the head by changing a relative positional relation between the head and the magnetic tape by driving a servo circuit on the basis of the digital level. The level detecting circuit includes a detection circuit for rectifying the reproduced television signal and for converting the reproduced television signal into a signal indicating a DC level. The level detecting circuit also includes a voltage controlled current source for varying an output current thereof in response to an output voltage of the detection circuit. The level detecting circuit further includes a capacitor charged by the output current of the voltage controlled current source, and a reset signal generating means for discharging and controlling the capacitor in synchronization with the predetermined integrating time interval. The level detecting circuit also includes a level detecting means for detecting a charging voltage of the capacitor as an analog level and for outputting a signal representing the analog level to the system controller to thereby obtain samples of the reproduced television signal of a predetermined integrating time interval without delay time. The system controller judges whether or not a predetermined condition for starting a tracking operation is satisfied, and detects the maximum level range of a video reproduction signal from the level of the video reproduction signal detected by the level detecting means in response to a tracking address when the predetermined condition for starting a tracking operation is satisfied. The system controller also detects the maximum level range of an audio reproduction signal from a level of the audio reproduction signal detected by the level detecting means in response to a tracking address. The system controller then judges whether or not a peak of the audio reproduction signal is present in the maximum level range of the video reproduction signal, and sets a central point of the maximum level range of the audio reproduction signal as a tracking position in cases where a peak of the audio reproduction signal is present in the maximum level range of the video reproduction signal.

In a third embodiment of the present invention a magnetic recording reproducer includes a head, and a level detecting circuit for detecting an analog level obtained by integrating and averaging a television signal reproduced by using the head within a predetermined integrating time interval when reproducing the television signal recorded on a magnetic tape. A system controller is used for converting the analog signal into a digital signal and for detecting a tracking position of the head by changing a relative positional relation between the head and the magnetic tape by driving a servo circuit on the basis of the digital level. The level detecting circuit includes a detection circuit for rectifying the reproduced television signal and for converting the reproduced television signal into a signal indicating a DC level. The level detecting circuit also includes a voltage controlled current source for varying an output current thereof in response to an output voltage of the detection circuit. The level detecting circuit further includes a capacitor charged with the output current of the voltage controlled current source, and a reset signal generation means for discharging and controlling the capacitor in synchronization with the predetermined integrating time interval. The level detecting circuit also includes a level detecting means for detecting a charging voltage of the capacitor as an analog level and outputting a signal representing the analog level to the system controller to thereby obtain samples of the reproduced television signal of a predetermined integrating time interval without delay time. The system controller judges whether or not a predetermined condition for starting a tracking operation is satisfied and detects the maximum level range of a video reproduction signal from the level of the video reproduction signal detected by the level detecting means in response to a tracking address when the predetermined condition for starting a tracking operation has been satisfied. The system controller also detects the maximum level range of an audio reproduction signal from a level of the audio reproduction signal detected by the level detecting means in response to a tracking address. The system controller then judges whether or not a peak of the audio reproduction signal is present in the maximum level range of the video signal, and sets a point at which the detected level of the audio reproduction signal reaches a maximum value as a tracking position in cases where no peak of the audio reproduction signal is present in the maximum level range of the video reproduction signal.

In a fourth embodiment of the present invention, a magnetic recording reproducer is used for detecting a level obtained by integrating and averaging a television signal reproduced by using a head thereof within a predetermined integrated interval when reproducing a television signal recorded on a magnetic tape, and is used to detect a tracking position of the head thereof by changing a relative positional relation between the head thereof and the magnetic tape by driving a servo circuit. The magnetic recording reproducer includes a detecting circuit for rectifying the reproduced signal and converting the reproduced signal into a signal indicating a DC signal. The magnetic recording reproducer also includes a voltage controlled current source for varying an output current thereof in response to an output voltage of the detecting circuit. The magnetic recording reproducer further includes a capacitor charged by the output current of the voltage controlled current source, a level detecting means for detecting a charging voltage of the capacitor and a reset signal generating means for discharging and controlling the capacitor in synchronization with a level detecting period. A system controller is used for judging whether or not a predetermined condition for starting a tracking operation exists, and for detecting the maximum level range of a video reproduction signal from the level of the reproduction signal detected by the level detecting means in response to a tracking address when the predetermined condition for starting a tracking operation is satisfied. The system controller also judges whether or not an audio signal is recorded on the magnetic tape so that a central point of the maximum level range of the video reproduction signal can be set as a tracking position when no audio signals are recorded on the magnetic tape. The system controller also sets a level detecting range of an audio signal and detects the maximum level range of an audio reproduction signal from a level of the audio reproduction signal detected by the level detection means in response to a tracking address. The system controller then judges whether or not a peak of the audio reproduction signal is present in the maximum range of the video reproduction signal. The system controller sets a central point of the maximum level range of the audio reproduction signal as a tracking position in cases where a peak of the audio reproduction signal is present in the maximum level range of the video reproduction signal. The system controller further sets a point at which the detected of the audio reproduction signal reaches a maximum value as a tracking position in cases where no peak of the audio reproduction signal is present in the maximum level range of the video reproduction signal.

In a fifth embodiment of the invention, a magnetic recording reproducer has a head and a level detecting circuit for detecting an analog level obtained by integrating and averaging a television signal reproduced by using the head within a predetermined integrating time interval when reproducing the television signal recorded on a magnetic tape. The reproducer includes a system controller for converting the analog level into a digital level and for detecting a tracking position of the head by changing a relative position relation between the head and the magnetic tape by driving a servo circuit on the basis of a digital level. The level detecting circuit includes a detection circuit for rectifying the reproduced television signal and for converting the reproduced television signal into a signal indicating a DC level. The level detecting circuit also includes an inverting amplifier for receiving the signal indicating the DC level from the detection circuit and outputting a signal obtained by inverting the received signal. The level detecting circuit further includes a voltage controlled current source for varying an output current thereof in response to an output voltage of the inverting amplifier, a capacitor charged by the output current of the voltage controlled current source, and a reset signal generating means for discharging and controlling the capacitor in synchronization with the predetermined integrating time interval. The level detecting circuit also includes a level detection means for detecting a charging voltage of the capacitor as an analog level and for outputting a signal representing the analog level of the system controller to thereby obtain samples of the reproduced television signal of the predetermined integrating time interval without time delay.

Thus, the magnetic recording reproducer of the present invention can easily carry out level detection of the reproduced signal in response to a tracking address by use of the system controller having an automatic tracking function by synchronizing a reset signal used for an integrating operation with a head switching signal. Further, the magnetic recording reproducer can immediately alter the tracking position of the head on the basis of the result of the level detection process carried out by the system controller. This system controller obtains the integral values of the video and audio reproduction signals within a predetermined time limit (for example, one frame) and detects the maximum level ranges of the video and audio reproduction signals to establish optimal tracking positions. Thereby the adjustment of the tracking can be carried out on the basis of real time detection of the levels of the video and audio reproduction signals.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF PREFERRED EMBODIMENT

Hereinafter, a magnetic recording reproducer embodying the present invention will be described by referring to the accompanying drawings.

Figure 1:
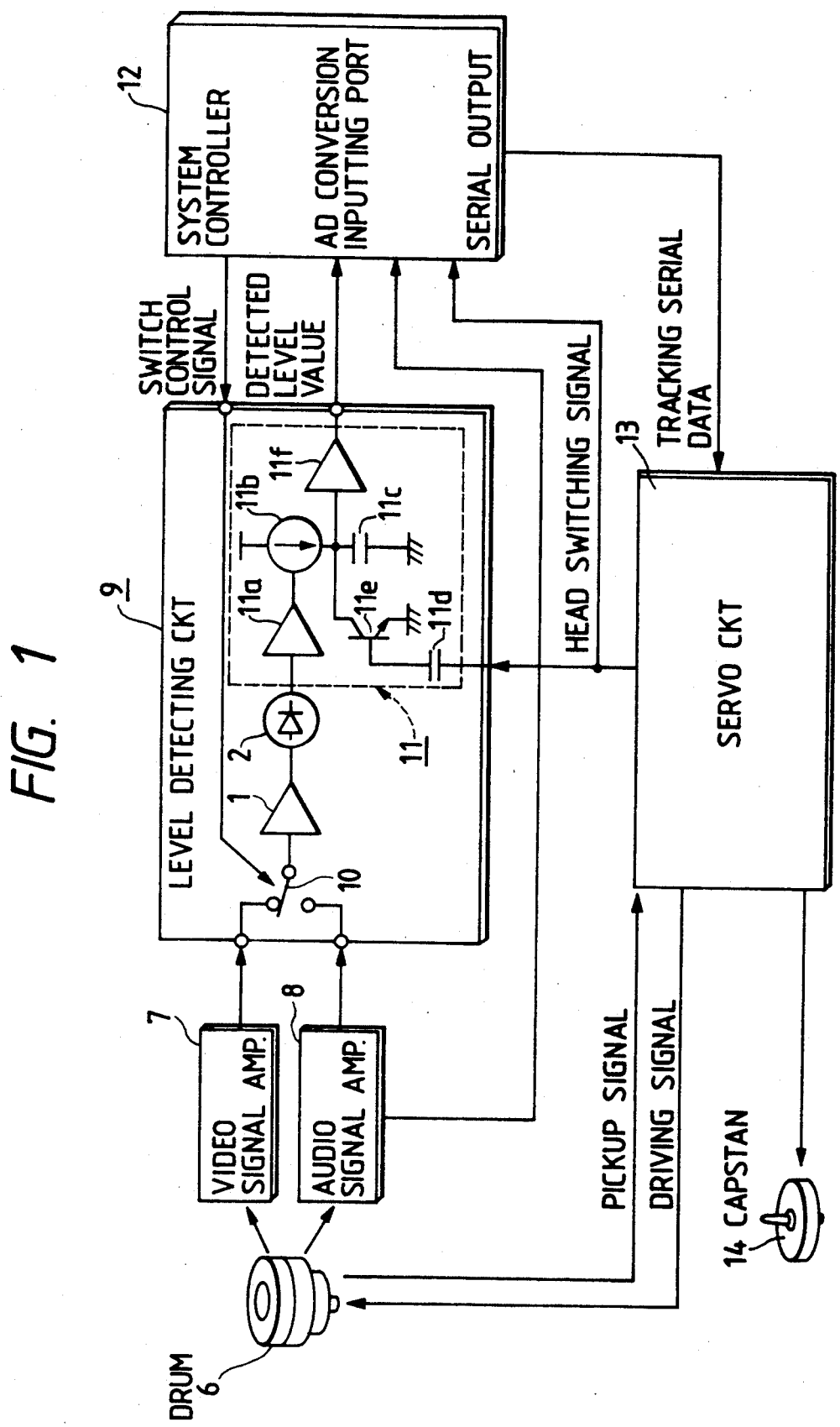
FIG. 1 is a diagram for showing the whole construction of an embodiment of the present invention.

FIG. 1 is a schematic block diagram for illustrating a system controller having an automatic tracking function and a level detecting circuit which serves as an interface circuit between signal amplifiers and the system controller of the magnetic recording reproducer. On a drum 6, for example, two channel video heads and two channel audio heads are arranged on the circumference thereof at predetermined intervals. Thereby, video signals recorded on a magnetic tape and Hi-Fi audio FM signals recorded in a deep portion of a video track on the magnetic track are reproduced or played back. Further, the reproduced video and Hi-Fi audio FM signals are inputted respectively through a video signal amplifier 7 and an audio signal amplifier 8 to a level detecting circuit 9, which serves as an interface circuit between the drum and the system controller and effects a level detection.

This level detecting circuit 9 comprises a selecting switch 10 for selecting one of the video and audio FM signals, an amplifier 1 for amplifying a selected FM reproduction signal, a rectifier 2 for converting the alternating level of an output of the amplifier 1 into a DC level and an integrator 11 for integrating the thus rectified FM reproduction signal in a predetermined integral interval (for example, one frame) and detects the level of the inputted FM reproduction signal of one frame.

Further, the integrator 11 comprises an inverting amplifier 11a for inverting an output of the rectifier 2, a voltage controlled current source 11b for increasing an output current thereof when an input voltage thereto is lowered; a capacitor 11c for storing electric charges transferred by the output current of the voltage controlled current source, a transistor 11e for receiving a head switching signal from a servo circuit 13, which will be described later, through the capacitor 11d as a reset signal, and controlling the charging and discharging of the capacitor 11c and an amplifier 11f for amplifying a charged voltage of the capacitor 11c. Moreover, the integrator 11 integrates the level of an FM signal of, for example, one frame and sends out a signal representing the result of the integration to an inputting port for an AD conversion means (hereunder sometimes referred to as an AD conversion inputting port) of a system controller 12.

Figure 2:
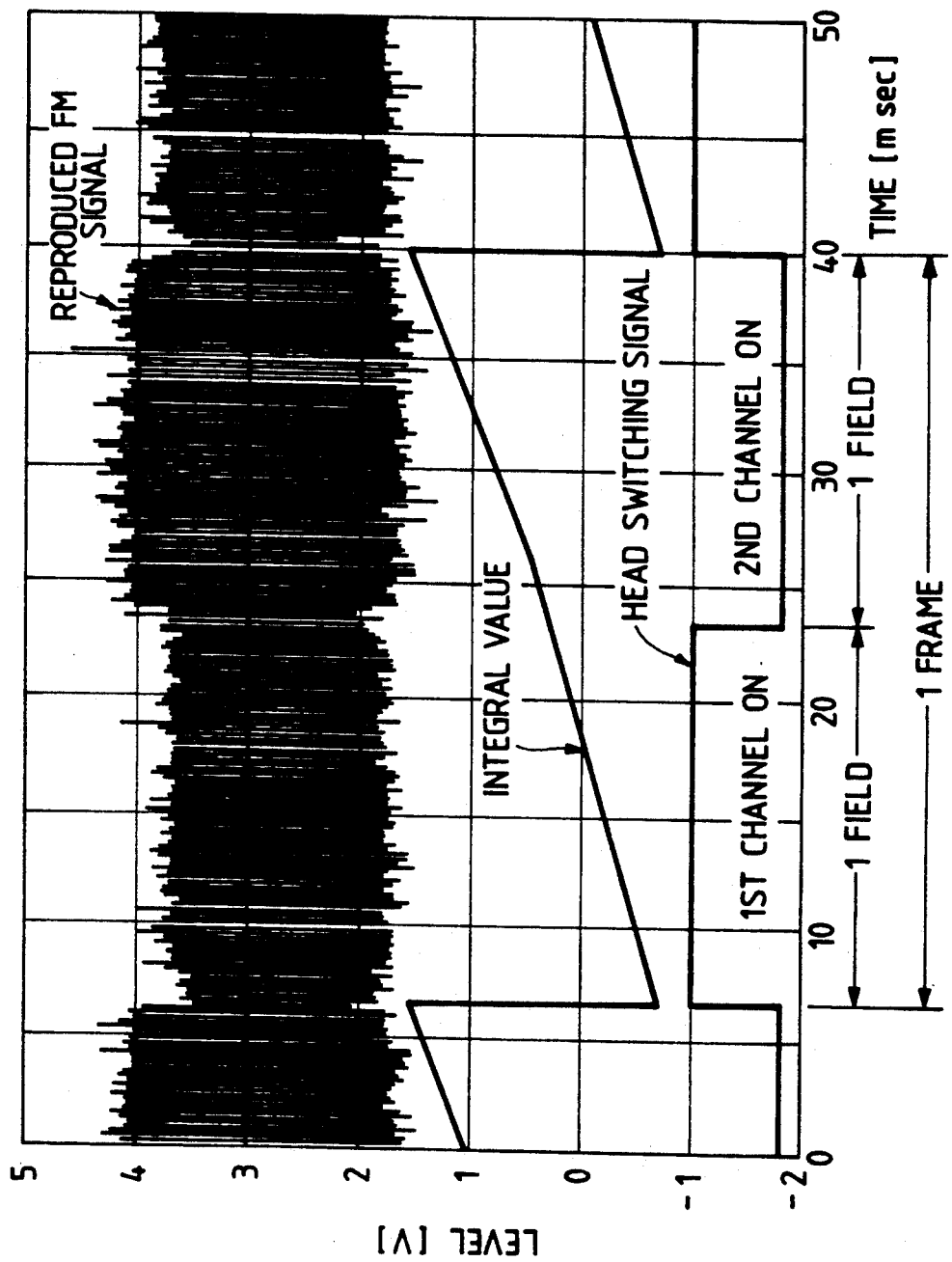
FIG. 2 is a waveform chart for illustrating the level detection effected by a level detecting circuit of FIG. 1.

That is, as shown in FIG. 2, the integrator 11 is reset by the head switching signal from the servo circuit 13, and then the capacitor 11c commences being charged and thereafter discharges when the next head switching signal is received by the integrator 11 which outputs a signal representing the value of the integral at the time immediately before the discharging of the capacitor 11c to the AD conversion inputting port of the system controller 12. As shown in FIG. 2, when a video (or audio) head switching signal rises, the integration of the signal obtained by rectifying the FM signal reproduced by a first channel video (or audio) head is started, and after the head switching signal falls, the integration of the signal obtained by rectifying the FM signal reproduced by a second channel video (or audio) head is accumulatively performed. Further, the result of the integration is given to the system controller 12 as an averaged sample of the FM reproduction signal of one frame.

Therefore, this magnetic recording reproducer according to the present invention can obtain a sample of the rectified FM reproduction signal of a predetermined intregrating interval (for instance, one frame) without delay time by using the level detecting circuit constructed as above described and can dispense with the low-pass filter which is indispensable for the prior art magnetic recording reproducer.

Thus, by synchronizing the head switching signal, which is a reset signal used for the integrating operation, with a signal representing a tracking address of the system controller for controlling the tracking operation by changing the relation in position between the magnetic tape and the head, this magnetic recording reproducer according to the present invention can easily detect an optimum tracking position on the basis of the value of the sample obtained by the level detecting circuit 9 in the manner which will be described later.

Figure 3:
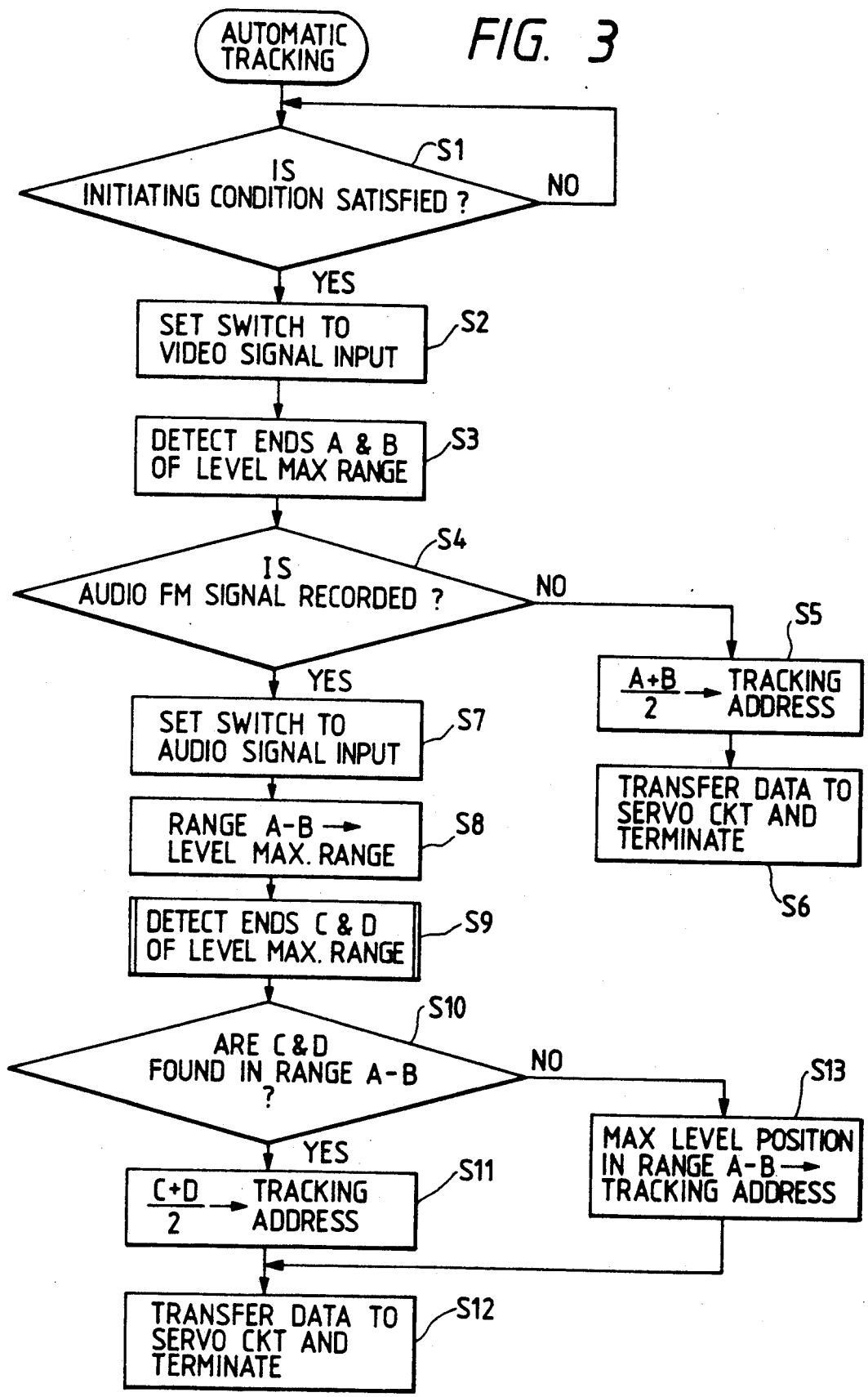
FIG. 3 is a flowchart for illustrating an operation of the system controller of FIG. 1.

Next, the system controller 12 having an automatic tracking function receives signals indicating the values of the integrals of the video and audio FM reproduction signals of one frame obtained by the level detecting circuit 9 at the AD conversion inputting port thereof. Further, when a predetermined condition for starting the tracking operation which will be described later is satisfied, the system controller 12 automatically detects the optimum tracking position by performing the processing of which the flowchart is shown in FIG. 3. Then, the servo circuit 13 receives tracking serial data as a tracking address from this system controller 12 and further outputs driving signals to the drum 6 and a capstan 14 to change the relation in position between the heads mounted on the drum 6 and the magnetic tape 14 in accordance with the tracking addresses. Moreover, a pickup head is fixedly disposed (not shown) adjacent to the drum 6 for detecting the rotational phase thereof. The servo circuit 13 receives a pickup signal from the pickup head and outputs the head switching signal, as conventionally.

Further, the following conditions can be taken as those for starting the automatic tracking operation of the system controller 12.

(a) A signal recorded on the magnetic tape is first reproduced after the power is turned on.

(b) A signal recorded on the magnetic tape is first reproduced after a cassette accommodating the magnetic tape is put into the magnetic recording reproducer.

(c) A recording time mode is changed from the standard playing time mode (SP) to the extended playing time mode (EP) or vice versa while a tape is played back.

(d) A reproduction control pulse signal is interrupted for more than 0.5 seconds.

(e) A state, in which the level of the FM signal drops due to some cause, is maintained for more than 2 seconds.

In any of these cases (a) to (e), there may occur the disagreement between the track and the path of the head. When the system controller 12 receives a detection signal indicating occurrence of such disagreement (not shown), the system controller 12 operates in accordance with the flowchart of FIG. 3. First, in step S1, it is checked whether or not the condition for starting the above described operation is satisfied. If satisfied, the program advances to step S2 whereupon the selecting switch 10 is placed in a position connecting to the video signal amplifier 7 and the video FM signal is inputted to the level detecting circuit 9.

Figure 4:
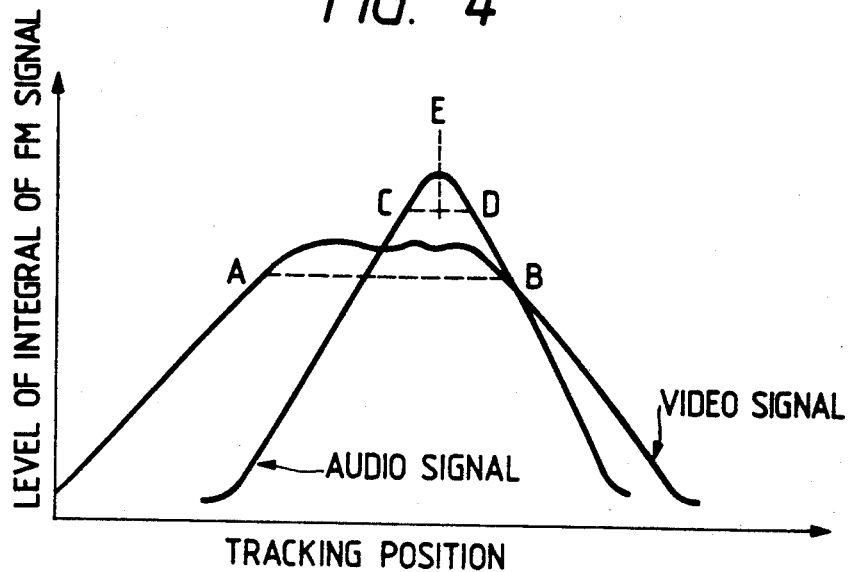
FIG. 4 is graph for showing the relation between the tracking position and the integrated level of each of the video and audio FM signals. This relation is to be used for setting the tracking position.
Figure 5:
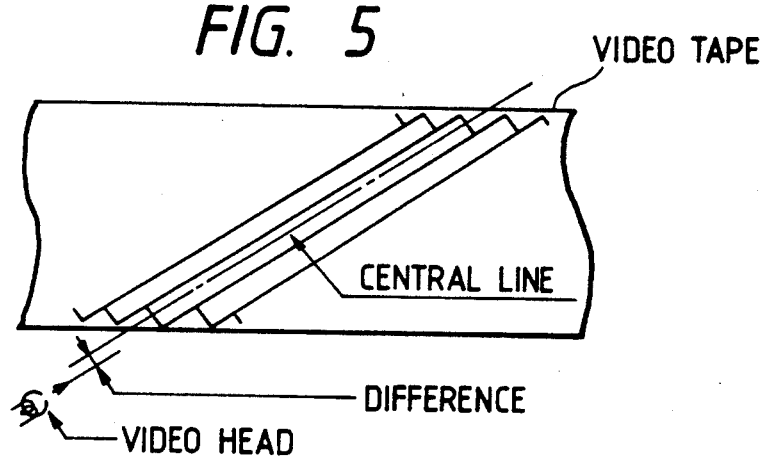
FIG. 5 is a diagram for illustrating a difference between a track recorded on a magnetic tape and the path of the head.
Figure 6:
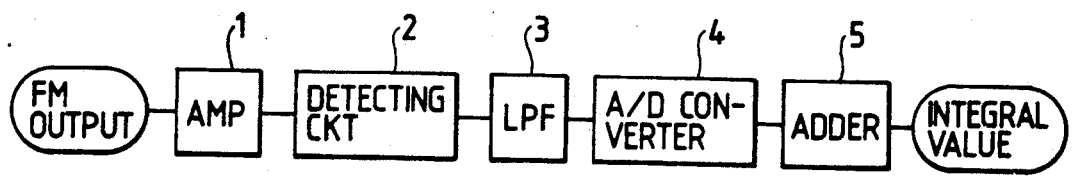
FIG. 6 is a schematic block diagram for showing the construction of a prior art level detecting circuit.

Next, in step S3, a subroutine is called and, as shown in FIG. 4, the level of the integral of the video FM signal corresponding to a tracking position is obtained, and then the both ends A and B of a level maximum range of the video FM signal, which level is set to be less than the maximum level of the integral of the video FM signal by a predetermined value, are detected. Further, the detected positions or tracking addresses A and B are stored therein. At that time, a switch changing signal is supplied from the system controller 12 to the selecting switch 10 of the level detecting circuit 9 which serves as an interface circuit between the amplifier 7 or 8 and the system controller 12. On the other hand, the system controller 12 supplies a signal indicating tracking serial data corresponding to the tracking address to the servo circuit 13 which sends out a driving signal to the drum 6 and the capstan 14 to vary the tracking by changing the relation in position between the head and the magnetic tape corresponding to the supplied tracking address.

The program further advances to step S4, whereupon it is determined on the basis of outputs of the audio FM signal amplifier 8 whether or not the audio FM signal is recorded. If not recorded, the tracking address is set as (A+B)/2 in step S5 and then the serial data of the tracking address are transferred to the servo circuit 13 and thereafter the automatic tracking processing is terminated in step S6. That is, in case where no audio FM signals are recorded on the magnetic tape, the value (A+B)/2 is supplied to the servo circuit 13 as a tracking address to perform the automatic tracking.

On the other hand, in case where an audio FM signal is recorded on the magnetic tape, a switch changing signal is supplied to the selecting switch 10 which is thereby placed in a position connected to the audio FM signal amplifier 8 in step S7. Then, the level detection is effected by the level detecting circuit 9, and as a result of this, is detected a position E shown in FIG. 4, at which the level of the audio FM signal, is maximum in the level maximum range A-B. That is, in step S8, the range of detecting the maximum level of the audio FM signal is set as the range between the ends A and B. Further, referring to FIG. 4, both ends C-D of a range (hereunder sometimes referred to as a maximum level range) of the tracking position corresponding to a level of the integral of the audio FM signal, which level is set to be a predetermined level less than the maximum level E of the integral of the audio FM signal by a predetermined value, are detected by starting the detection from the position B toward the position A and checking the levels between the positions B and A through the position E and finally detecting the positions C and D, at which the level of the integral of the audio FM signal is the predetermined level, and in addition the positions C and D are stored therein. In case where it is found in step S10 that the maximum level range C-D of the audio FM signal is present in the maximum level range A-B of the video FM signal, the tracking address is set as (C+D)/2 in step S11, and thereafter the tracking serial data are transferred to the servo circuit 13 and then the automatic tracking is terminated in step S12. On the other hand, in case where it is found in step S10 that the maximum level range C-D of the audio FM signal is not present in the maximum level range A-B of the video FM signal, the position or address at which the level of the integral of the audio FM signal is maximum is set as the tracking address in step S13, and thereafter, similarly, the tracking serial data are transferred to the servo circuit 13 and then the automatic tracking is terminated in step S12.

As above stated, the audio FM signal is given a priority in establishing the tracking position or address. This is because of the fact that generally, the peak of the level of the integral of the video FM signal is shifted from that of the level of the integral of the audio FM signal and that noises are more liable to occur with respect to the audio FM signal in comparison with the video FM signal. Thus, the optimum tracking position for the reproduction of the audio and video FM signals can be established.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A magnetic recording reproducer having a head, a level detecting circuit for detecting an analog level obtained by integrating and averaging a television signal reproduced by using the head within a predetermined integrating time interval when producing the television signal recorded on a magnetic tape and a system controller for converting the analog level into a digital level and for detecting a tracking position of the head by changing a relative positional relation between the head and the magnetic tape by driving a servo circuit on the basis of the digital level, said level detecting circuit comprising:

a detection circuit for rectifying the reproduced television signal and for converting the reproduced television signal into a signal indicating a DC level;

a voltage controller current source for varying an output current thereof in response to an output voltage of said detection circuit;

a capacitor charged by the output current of said voltage controlled current source;

a reset signal generating means for discharging and controlling said capacitor in synchronization with the predetermined integrating time interval; and a level detecting means for detecting a charging voltage of said capacitor as an analog level and for outputting a signal representing the analog level to said system controller to thereby obtain samples of the reproduced television signal of a predetermined integrating time interval without delay time, wherein said system controller judges whether or not a predetermined condition for starting a tracking operation is satisfied, and detects the maximum range level of a video reproduction signal from the level of the video reproduction signal detected by the level detecting means in response to a tracking address when the predetermined condition for starting a tracking operation is satisfied, and judges whether or not an audio signal is recorded on the magnetic tape, and sets a central point of the maximum level range of the video reproduction signal as a tracking position when no audio signals are recorded on the magnetic tape.

2. A magnetic recording reproducer having a head, a level detecting circuit for detecting an analog level obtained by integrating and averaging a television signal reproduced by using the head within a predetermined integrating time interval when reproducing the television signal recorded on a magnetic tape and a system controller for converting the analog level into a digital level and for detecting a tracking position of the head by changing a relative positional relation between the head and the magnetic tape by driving a servo circuit on the basis of the digital level, said level detecting circuit comprising:
   a detection circuit for rectifying the reproduced television signal and for converting the reproduced television signal into a signal indicating a DC level;
   a voltage controlled current source for varying an output current thereof in response to an output voltage of said detection circuit;
   a capacitor charged by the output current of said voltage controlled current source;
   a reset signal generating means for discharging and controlling said capacitor in synchronization with the predetermined integrating time interval; and
   a level detecting means for detecting a charging voltage of said capacitor as an analog level and for outputting a signal representing the analog level to said system controller to thereby obtain samples of the reproduced television signal of a predetermined integrating time interval without delay time, wherein said system controller judges whether or not a predetermined condition for starting a tracking operation is satisfied, and detects the maximum level range of a video reproduction signal from the level of the video reproduction signal detected by the level detecting means in response to a tracking address when the predetermined condition for starting a tracking operation is satisfied, and also detects the maximum level range of an audio reproduction signal from a level of the audio reproduction signal detected by the level detecting means in response to a tracking address, and judges whether or not a peak of the audio reproduction signal is present in the maximum level range of the video reproduction signal, and sets a central point of the maximum level range of the audio reproduction signal as a tracking position in cases where a peak of the audio reproduction signal is present in the maximum level range of the video reproduction signal.

3. A magnetic recording reproducer having a head, a level detecting circuit for detecting an analog level obtained by integrating and averaging a television signal reproduced by using the head within a predetermined integrating time interval when reproducing the television signal recorded on a magnetic tape and a system controller for converting the analog level into a digital level and for detecting a tracking position of the head by changing a relative positional relation between the head and the magnetic tape by driving a servo circuit on the basis of the digital level, said level detecting circuit comprising;
   a detection circuit for rectifying the reproduced television signal and for converting the reproduced television signal into a signal indicating a DC level;
   a voltage controlled current source for varying an output current thereof in response to an output voltage of said detection circuit;
   a capacitor charged by the output current of said voltage controlled current source;
   a reset signal generating means for discharging and controlling said capacitor in synchronization with the predetermined integrating time interval; and
   a level detecting means for detecting a charging voltage of said capacitor as an analog level and for outputting a signal representing the analog level to said system controller, to thereby obtain samples of the reproduced television signal of a predetermined integrating time interval without delay time, wherein said system controller judges whether or not a predetermined condition for starting a tracking operation is satisfied, and detects the maximum level range of a video reproduction signal from the level of the video reproduction signal detected by the level detecting means in response to a tracking address when the predetermined condition for starting a tracking operation is satisfied, and also detects the maximum level range of an audio reproduction signal from a level of the audio reproduction signal detected by the level detecting means in response to a tracking address, and judges whether or not a peak of the audio reproduction signal is present in the maximum level range of the video signal, and sets a point, at which the detected level of the audio reproduction signal reaches a maximum value, as a tracking position in cases where no peak of the audio reproduction signal is present in the maximum level range of the video reproduction signal.

4. A magnetic recording reproducer for detecting a level obtained by integrating and averaging a television signal reproduced by using a head thereof within a predetermined integrating interval when reproducing the television signal recorded on a magnetic tape and detecting a tracking position of the head thereof by changing a relative positional relation between the head thereof and the magnetic tape by driving a servo circuit, said magnetic recording reproducer comprising:
   a detecting circuit for rectifying the reproduced signal and converting the reproduced signal into a signal indicating a DC level;
   a voltage controlled current source for varying an output current thereof in response to an output voltage of said detecting circuit;
   a capacitor charged by the output current of said voltage controlled current source;
   a level detecting means for detecting a charging voltage of said capacitor;

a reset signal generating means for discharging and controlling said capacitor in synchronization with a level detecting period; and a system controller for judging whether or not a predetermined condition for starting a tracking operation exists, and for detecting the maximum level range of a video reproduction signal from the level of the video reproduction signal detected by the level detecting means in response to a tracking address when the predetermined condition for starting a tracking operation is satisfied, and for judging whether or not an audio signal is recorded on the magnetic tape, and for setting a central point of the maximum level range of the video reproduction signal as a tracking position when no audio signals are recorded on the magnetic tape, and for setting a level detecting range of an audio signal and detecting the maximum level range of an audio reproduction signal from a level of the audio reproduction signal detected by the level detecting means in response to a tracking address, and for judging whether or not a peak of the audio reproduction signal is present in the maximum level range of the video reproduction signal, and for setting a central point of the maximum level range of the audio reproduction signal as a tracking position in cases where a peak of the audio reproduction signal is present in the maximum level range of the video reproduction signal, and for setting a point, at which the detected level of the audio reproduction signal reaches a maximum value, as a tracking position in cases where no peak of the audio reproduction signal is present in the maximum level range of the video reproduction signal.

* * * * *